UNITED STATES PATENT OFFICE.

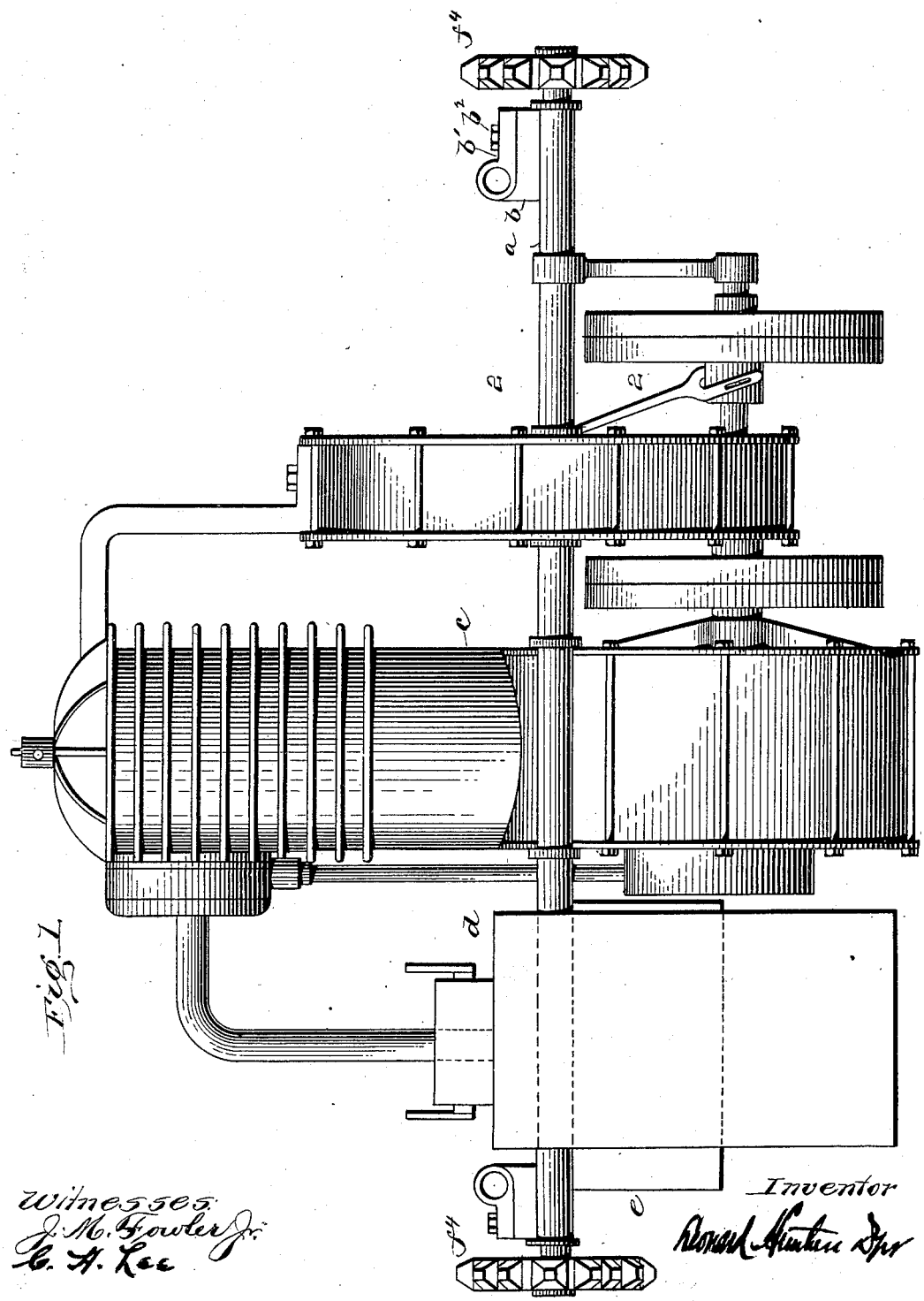

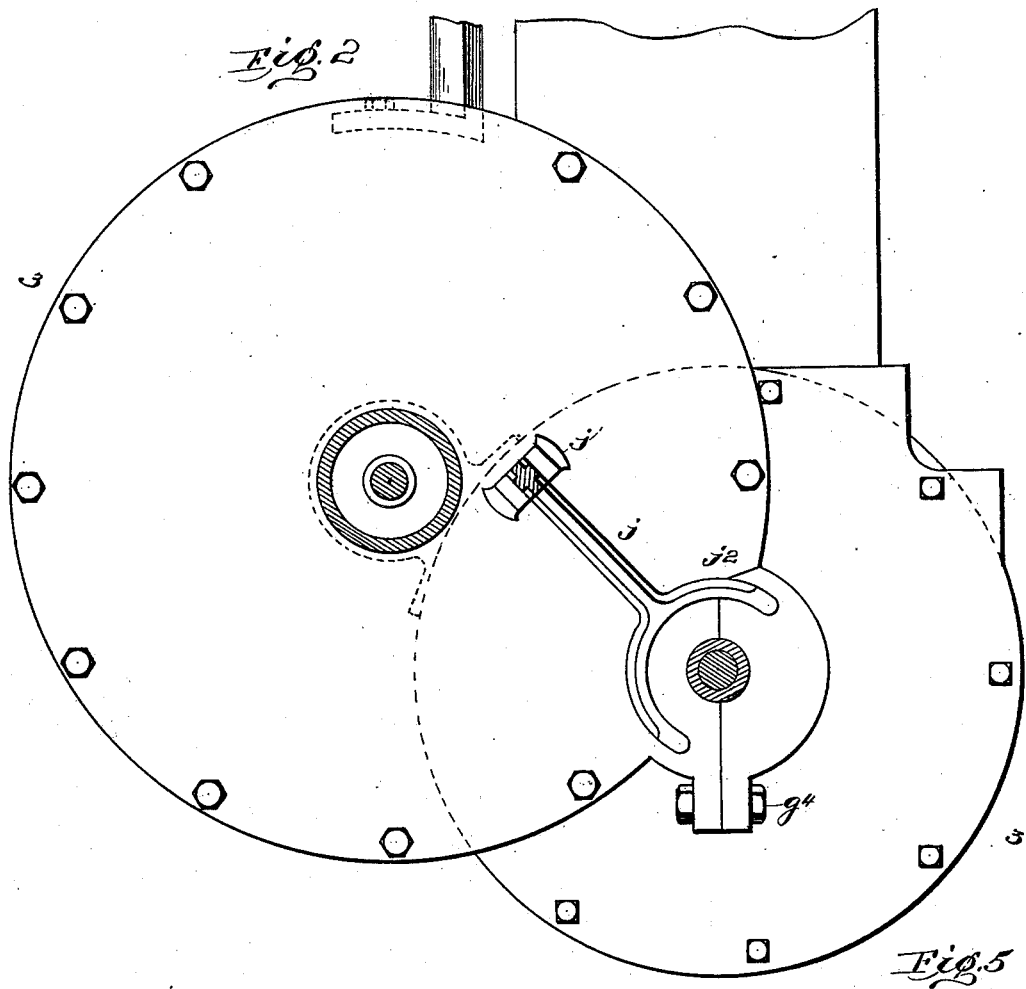
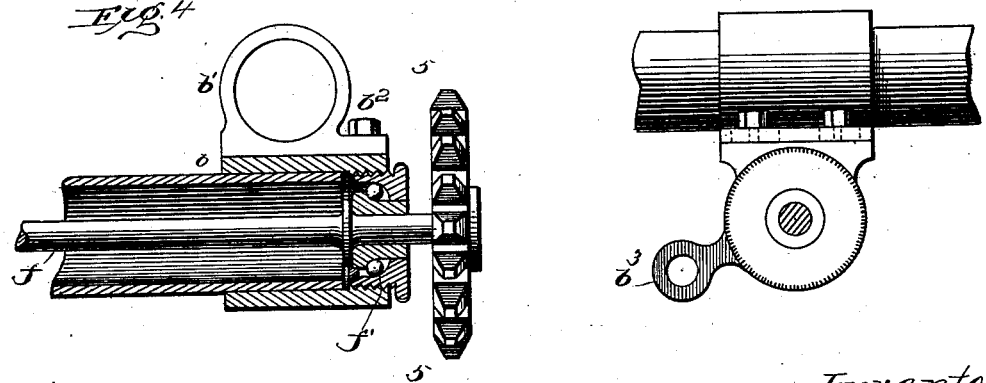

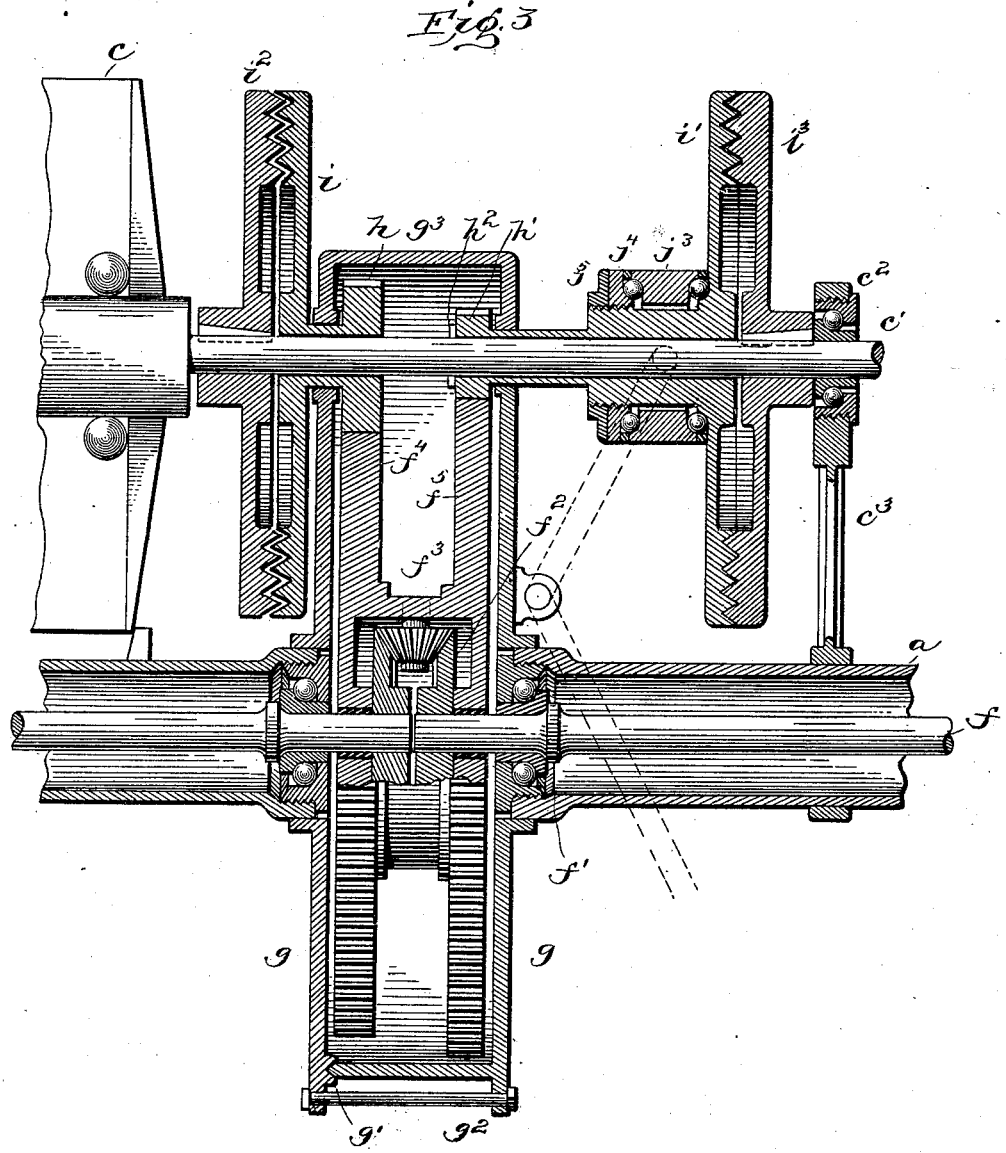

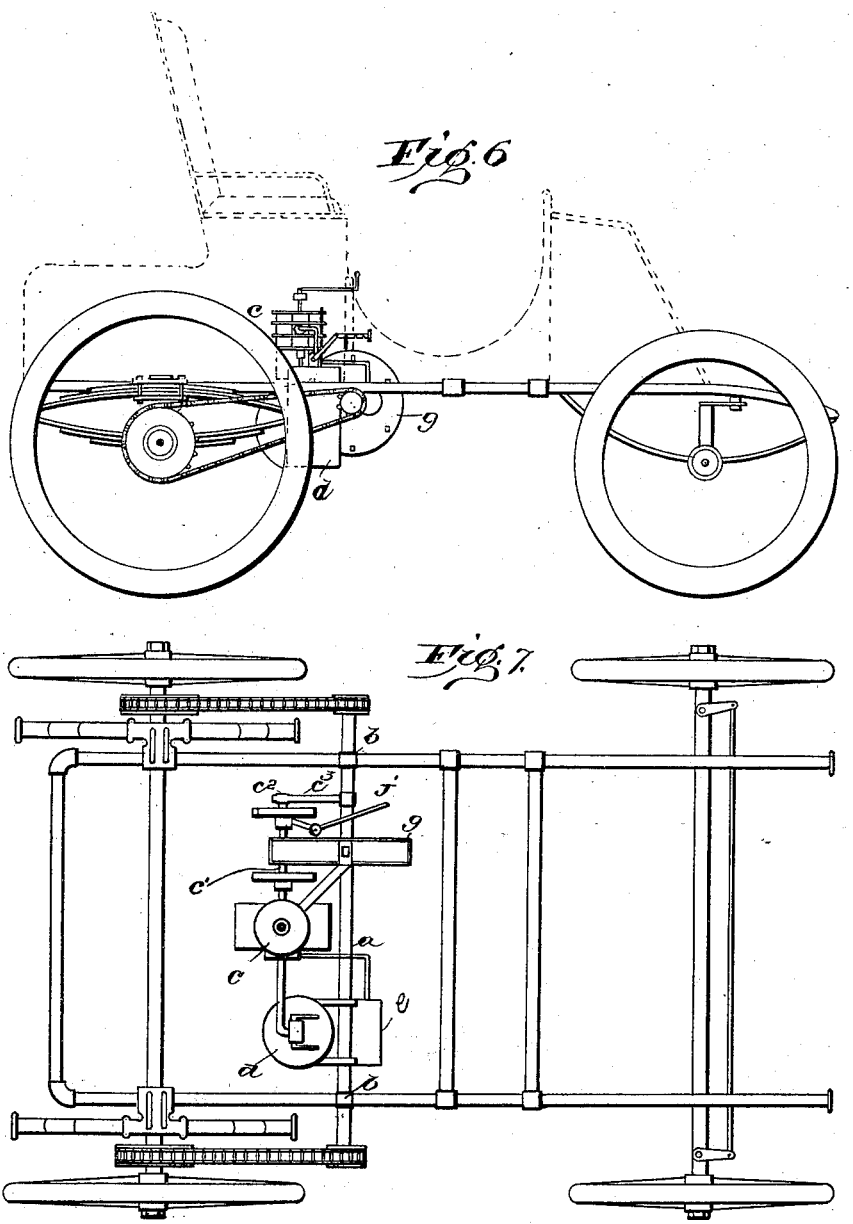

LEONARD HUNTRESS DYER, OF WASHINGTON, DISTRICT OF COLUMBIA, ASSIGNOR OF ONE-FOURTH TO FRANK L. DYER, OF MONTCLAIR, NEW JERSEY.

AUTOMOBILE VEHICLE.

SPECIFICATION forming part of Letters Patent No. 676,223, dated June 11, 1901.

Application filed February 3, 1900. Serial No. 3,879. (No model.)

*To all whom it may concern:*

Be it known that I, LEONARD HUNTRESS DYER, a citizen of the United States, residing at Washington, in the District of Columbia, have invented certain new and useful Improvements in Automobile Vehicles, (Case No. 13;) and I do hereby declare the following to be a full, clear, and exact description of the invention, which will enable others skilled in the art to which it appertains to make and use the same.

This invention relates to automobiles and the operating and driving mechanism therefor.

The invention relates generally to an automobile wherein the source of power is an internal-combustion engine, an expansible-vapor engine, or the like mounted upon a body or running-frame and connected by gearing to the driving-wheels.

The invention is to be distinguished from an automobile wherein the motor is mounted adjacent to or upon the driving-wheels and in which gearing of extended length is unnecessary.

In automobile vehicles of the type to which this invention relates several parallel shafts are necessarily employed in order to get the requisite reduction of speed from the rapidly-revolving engine-shaft to the slower driving-wheels. The several shafts being mounted in bearings upon the frame, it is absolutely necessary to have them parallel in order to prevent the gears from binding. Great difficulty has been experienced in providing a frame sufficiently rigid to properly support the shafts in parallelism and at the same time to be sufficiently light for the desired purposes. It has also been found difficult, if not impossible, to provide means whereby the engine and gears could be temporarily removed and replaced without dismantling the parts or readjusting the connections. By my invention I obviate the necessity of having the vehicle-frame sufficiently rigid to prevent buckling of the shafts and disalining the bearings, and, in fact, if the exigencies of the case demand, means whereby the frame may be elastic and yieldable and will give in every direction may be provided.

The motor and all the gears appertaining thereto are mounted upon a bridge sufficiently rigid to resist buckling and torsion. This bridge is mounted in removable and adjustable bearings on the side bars of the frame. Upon the bridge being removed all of the driving mechanism of the vehicle will be removed likewise without dismantling or varying the adjustments.

The invention relates, in addition, to means whereby the gears may be incased in an oil-bath to run free from noise and to reduce the wear as much as possible.

Generally speaking, the invention consists in providing a suitable framework, which may or may not be tubular, having cross members and fore-and-aft members suitably connected together. To the fore-and-aft members is removably attached the rigid unyieldable bridge, which preferably carries the concentrically-mounted counter-shaft and attached differential. Connections are made between this counter-shaft and the driving-wheels of the vehicle. Upon the bridge and connected rigidly thereto is the engine or motor and its generative connections. If the engine be of the internal-combustion type, these connections will consist of the carbureter and muffler, these two latter having to be connected to the engine by pipes in which it is difficult to provide flexible joints. If the engine be of the expansible-vapor variety—as, for instance, a steam-engine—the generator or boiler may be mounted upon the bridge.

The engine-shaft is of but sufficient length to carry the necessary gears with which connect the gears upon the counter-shaft. I prefer to use gears for two speeds, a high and a low, which are applied by separate and independent clutches. The gears I prefer to incase, so that they may run in a bath of oil and be preserved from contact with dust and may run with a minimum of noise. The clutches, on the contrary, I prefer to be outside of the casing, so as not to be in contact with oil. The clutches are so arranged that one lever suffices to connect or disconnect either.

The bridge carrying the engine, its generative connections, and the necessary speed reducing and changing gears may be removed or replaced whenever desired without dismantling or varying the adjustment. The parts may therefore be tested and operated when removed from the frame of the vehicle, a possibility that possesses great practical advantages over all forms now in use.

In order to better understand the nature of my invention, attention is directed to the accompanying drawings, forming a part of this specification, and in which—

Figure 1 is a side view of the bridge, gearing, a motor of the internal-combustion type, and its general connections. Fig. 2 is an enlarged sectional view thereof, taken on the lines 2 2 looking toward the left. Fig. 3 is a sectional view of Fig. 2, taken on the lines 3 3 and looking in the direction of the arrow. Fig. 4 is a sectional view of the outer end of the bridge, showing the removable fastening for the frame and the outer ball-bearing for the counter-shaft. Fig. 5 is a sectional view thereof, taken on the lines 5 5 of Fig. 4. Fig. 6 is a side view of the running-gear of an automobile with the body thereof in broken lines, and Fig. 7 is a top view thereof.

In all the several views like parts are designated by the same letters of reference.

The principal part of the invention consists of the bridge $a$, secured by adjustable and removable bearings $b$ to the fixed tablets or supports $b'$, brazed or otherwise suitably attached in the proper position on the fore-and-aft members of the vehicle-frame. The parts $b$ and $b'$, as shown, are attached together by means of nuts and bolts $b^2$, passing through slots, as shown in Fig. 5, to allow of adjustment. This peculiar form of fastening is shown merely for the purpose of illustration, and any other form of support may as well be employed.

The motor (shown conventionally at $c$) is rigidly supported upon the bridge, as are also the carbureter $d$ and the muffler $e$. As both carbureter and muffler must be connected to the engine by means of tubes in which it is difficult to provide for flexibility, by mounting these organs on the bridge the need of flexible tubes is obviated and rigid simple connections may be employed.

If an electric sparking device be used, it may be connected to the motor by flexible wires, as will be obvious.

If a steam-engine be used, the boiler may be substituted in lieu of the carbureter $d$ and the tank for the water-supply in lieu of the muffler $e$. The sole point is to make the operative mechanism entirely independent of the vehicle-body and supported as an operative entirety on the bridge $a$.

The counter-shaft $f$ is preferably concentrically mounted to turn within the bridge $a$ by means of ball-bearings $f'$ adjacent to the center and the outer extremities of the counter-shaft. The shaft is divided and provided with a differential $f^2$, around which is provided a drum for the application of the band-brake. The sprocket-wheels $f^4$ are keyed to the outer extremities of the counter-shaft to which the driving-chains are applied. A part of the bridge adjacent to the differential is formed with an enlargement forming a gear-case $g$. The two halves are provided with a dust and oil proof joint $g'$ and are secured together by bolts $g^2$.

The engine-shaft $c'$ is arranged parallel to the counter-shaft $f$. Its free extremity is mounted in the ball-bearing $c^2$, depending from a bracket $c^3$ on the bridge $a$. The engine-shaft carries the two clutches and two gears, as shown, each clutch being in the nature of a fly-wheel. The gears are constructed as follows: The high-speed gear $h$ is loosely mounted upon the shaft $c'$ and engages with a small gear $f^4$, supported upon the differential. The low-speed gear $h'$ engages with the corresponding gear $f^5$, also supported upon the differential. The gears $h$ and $h'$ are formed upon the moieties $i$ $i'$ of the friction-clutches. These portions $i$ and $i'$ may be made to engage with the fixed parts $i^2$ and $i^3$, keyed to the engine-shaft $c$. The bearing-faces of the two clutch members are staggered, as shown, to make them more efficient. The two clutches are applied or disengaged by means of the single lever $j$, pivoted to lugs $j'$, formed upon one face of the gear-box $g$. One extremity of the lever $j$ is bifurcated at $j^2$ and connects with a ring $j^3$, mounted in ball-bearings on the hub of the moving clutch member $i'$. The ball-race $j^4$ and the lock-nut $j^5$ serve to adjust the several parts of the bearing.

The gear $h'$ is provided with a protuberance $h^2$, which may be made to engage with the face of the gear $h$ by sliding the gear $h'$ a considerable distance to the left. Such sliding motion will first free the gear $h'$ from mesh with its partner $f^5$ and will then engage with the gear $h$, moving it bodily to the left and engaging its movable clutch member $i$ with the fixed member $i^2$. A reverse movement of the gear $h'$ will first disengage the clutch and then slip the gear $h'$ into mesh with its partner $f^5$. The motion to the right being continued, the two halves $i'$ and $i^3$ of the second clutch will be brought into engagement, which will operate the low-speed gear. By this arrangement when the high-speed gear is in use, as it is most of the time, the low-speed gear is entirely disconnected. I am also able by this arrangement to do away with the necessity of employing sliding feathers or keyways, as is usually necessary in changeable gears.

The gears $h$ and $h'$ are covered by a cap $g^3$, secured by the bolts $g^4$, as shown.

$b^3$ is a lug into which is bolted one of the thrust-rods to the rear axle.

Having now described and ascertained the nature of my invention, what I claim as new therein, and desire to secure by Letters Patent, is—

1. In an automobile vehicle, a rigid bridge therefor, carrying the motor and its operating parts thereon, self-contained, and a shaft therein, and connections between the motor and shaft.

2. In an automobile vehicle, a removable rigid bridge therefor, carrying the motor and its operating parts thereon, self-contained, and a shaft therein, and connections between the motor and shaft.

3. In an automobile vehicle, a rigid bridge therefor, a counter-shaft therein, gears on the counter-shaft, a gear-case surrounding the gears, a motor and its operating parts carried by the bridge, a motor-shaft, gears on said motor-shaft inside the gear-case, and clutches on said motor-shaft outside of the gear-case.

4. In an automobile vehicle, a removable rigid bridge therefor, a counter-shaft therein, gears on the counter-shaft, a gear-case surrounding the gears, a motor and its operating parts carried by the bridge, a motor-shaft, gears on said motor-shaft inside the gear-case, and clutches on said motor-shaft outside of the gear-case.

5. In an automobile vehicle, a removable rigid bridge therefor, formed of two parts with a connecting-casing, a counter-shaft within the bridge, gears on the counter-shaft within the casing, a motor and its operating parts carried by the bridge, a motor-shaft, gears on said motor-shaft inside of the gear-casing, and clutches on the motor-shaft outside of the casing.

6. In an automobile vehicle, a removable rigid bridge therefor, a counter-shaft therein, gears on the counter-shaft, a motor and its operating parts carried by the bridge, a motor-shaft, clutch members rigidly keyed to said shaft, gears loosely mounted on said shaft, with integrally-formed clutch members, and means for engaging said clutch members.

7. In an automobile vehicle, a removable rigid bridge therefor, a counter-shaft therein, gears on the counter-shaft, a motor and its operating parts carried by the bridge, a motor-shaft, clutch members rigidly keyed to said motor-shaft, gears loosely mounted on said motor-shaft, carrying clutch members thereon, and a single shifting lever connected to one movable clutch member whereby either of said clutches may be engaged.

8. In an automobile vehicle, a removable rigid bridge therefor, formed of two parts, with a connecting-casing, a counter-shaft within the bridge, gears on the counter-shaft within the casing, a motor and its operating parts carried by the bridge, a motor-shaft, clutch members rigidly keyed to said motor-shaft, gears loosely mounted on said motor-shaft within the casing and carrying clutch members outside the casing, and means for engaging said clutch members.

9. In an automobile vehicle, a removable rigid bridge therefor, formed of two parts, with a connecting-casing, a counter-shaft within the bridge, gears on the counter-shaft within the casing, a motor and its operating parts carried by the bridge, a motor-shaft, clutch members rigidly keyed to said motor-shaft, gears loosely mounted on said motor-shaft within the casing and carrying clutch members outside the casing, and a single shifting lever connected to one movable clutch member whereby either of said clutches may be engaged.

This specification signed and witnessed this 3d day of February, 1900.

LEONARD HUNTRESS DYER.

Witnesses:
ALEXANDER S. STEUART,
M. A. MCLEOD.